United States Patent [19]

Maringer

[11] 4,215,084
[45] * Jul. 29, 1980

[54] METHOD AND APPARATUS FOR PRODUCING FLAKE PARTICLES

[75] Inventor: Robert E. Maringer, Worthington, Ohio

[73] Assignee: The Battelle Development Corporation, Columbus, Ohio

[*] Notice: The portion of the term of this patent subsequent to May 15, 1996, has been disclaimed.

[21] Appl. No.: 902,358

[22] Filed: May 3, 1978

[51] Int. Cl.² .................. B01J 2/02; B22D 23/08
[52] U.S. Cl. .................................. 264/8; 425/8; 164/130; 164/335
[58] Field of Search ............. 164/78, 87, 127, 130, 164/423, 429, 271, 158, 335; 264/8; 425/8

[56] References Cited

U.S. PATENT DOCUMENTS

| | | | |
|---|---|---|---|
| 3,349,835 | 10/1967 | Müller | 164/158 |
| 3,710,842 | 1/1973 | Mobley et al. | 164/78 |
| 3,838,185 | 9/1974 | Maringer et al. | 164/423 X |
| 3,896,203 | 7/1975 | Maringer et al. | 164/87 X |
| 3,904,344 | 9/1975 | Maringer et al. | 164/87 X |
| 3,908,745 | 9/1975 | Caldwell et al. | 164/423 X |
| 3,938,583 | 2/1976 | Kavesh | 164/429 X |
| 4,077,462 | 3/1978 | Bedell et al. | 164/429 |

Primary Examiner—Robert D. Baldwin
Assistant Examiner—J. Reed Batten, Jr.
Attorney, Agent, or Firm—Robert B. Watkins

[57] ABSTRACT

A method for producing flake particles by projecting a continuing stream of molten material upon the surface of a rotating generally circular, heat extracting drum, having a serrated edge with each serration comprising a radial surface and an angularly disposed connecting surface from the base of one radial surface to the peripheral extremity of the adjacent radial surface; and rotating the heat extracting drum at a speed relative to the size and shape of the serrations and relative to the rate of molten material projection to form a discrete flake particle on each angularly disposed surface; followed by removing each particle from the surface after each particle is at least partially solidified; and cooling the particles in a surrounding atmosphere.

An apparatus for producing flake particles comprising means for projecting a stream of molten material upon a rotatable heat extracting drum member having a serrated generally circular peripheral edge, with each serration having a radial surface and an angular surface connecting the base of one radial surface with the peripheral extremity of the next radial surface; and a shaft supporting the heat extracting member for rotation at a controlled speed; with means responsive to the rate of projection of the molten material upon the serrated surface of the heat extracting member to control its speed of rotation relative to the rate of projection of molten material.

17 Claims, 5 Drawing Figures

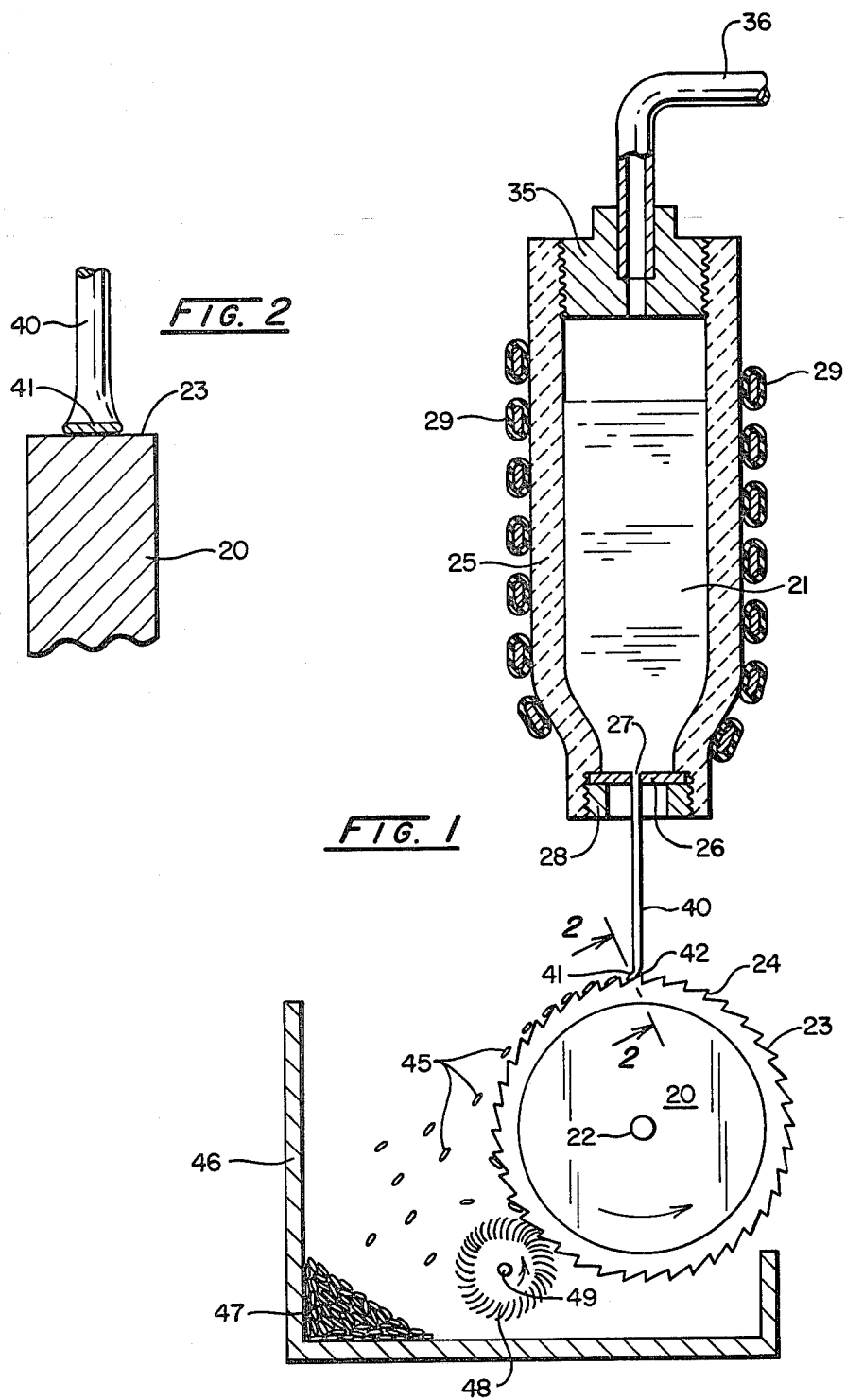

METHOD AND APPARATUS FOR PRODUCING FLAKE PARTICLES

BACKGROUND OF THE INVENTION

This invention relates to a method capable of producing flake particles directly upon the surface of a rotating member having discrete serrations in the peripheral edge thereof by projecting a stream of molten material upon the moving surface, forming flake particles on the serrations.

As used herein the terms flake particles, flakes and flake refer to particles of relatively small size in the hundredths of an inch range, and the terms include particles frequently referred to as powders because of their small size.

A disclosure of valuable characteristics of flake particles and powders will be found in pending U.S. Patent Application Ser. No. 826,798, now Pat. No. 4,154,284 issued May 15, 1979, made by the same applicant as this application and assigned to the same assignee. A discussion of size and other properties that are desirable in particles and powders is found in a paper published in Solidification Technology, pp. 317–336, NCIC in 1974.

A large number of methods exist for the manufacture of metal flakes or powders. These range from various mechanical methods such as grinding or filing to casting methods utilizing water or jets to break up a molten metal stream.

A method of producing flake particles directly from a supply of molten material by the use of a rotating member having discrete serrations in the peripheral edge thereof in which the leading surfaces of the serrations contact the molten material and have formed thereon flake powders is disclosed in the patent application by the same inventor recited above.

Most of the prior art methods that are used to make flake particles have various deficiencies. For instance, an early method was to grind or chip or cut the ends of a wire or rod in progressive sectional slices, each ending up as a flake or powder particle. In this process, the wire rod had to be formed and mechanically worked to its appropriate cross section before the slicing operation, which was time consuming and an extra expense. The slicing, grinding, or chipping required multiple tool faces which wore and became dull, requiring replacement, sharpening, and other expensive treatments.

Other prior art methods using atomization and spraying are relatively uncontrolled from a particle size distribution and configuration standpoint. In these methods, an orifice is required to atomize and spray the molten material.

After the molten material is projected in a stream through the orifice it is contacted with a blast of air or other gas which breaks the stream up into small particles. The particles either cool and solidify in the air or gas stream, or are caused to strike a cool surface to accomplish this result. The particles resulting from these processes are of random shapes, size, and grain size.

In the spray atomization process, because some particles are very small, they may have had very rapid quench rates, and have very small grain size. However, this group remains a small portion of the total.

Another prior art method in the production of flakes is the process of ball milling particles produced by other methods such as those described above. The ball milling process flattens out spherically shaped particles by crushing the particles between the rolling balls.

Although it is known in the laboratory how to produce rapid quench rates as high as $10^7$–$10^9$ C. degrees per second and to produce grain sizes of less than 0.01 micron, from a practical commercial application standpoint, methods capable of producing the formed product are still being sought and have not been reported at quench rates uniformly above about $10^4$ C. degrees per second, except for the method disclosed in applicant's application recited above.

In the present process the formation of the materials into final flake particle form is carried out while the material is changing directly from the molten state, and therefore inorganic compounds having properties in the molten state similar to that of molten metals and metal alloys may be formed in substantially the same manner. The properties that must be similar to those of molten metal are the viscosity and surface tension in the molten state, as well as the compound having a substantially discrete melting point, rather than the broad continuous range of viscosities characteristic of molten glasses.

Materials conforming to the class for this invention and having such properties will have a viscosity in the molten state when at a temperature of within 25% of their equilibrium melting point in degrees Kelvin in the range of $10^{-3}$ to one poise as well as having surface tension values in that same temperature range in the order of 10 to 2500 dynes per centimeter.

The prior art discloses atomization of molten stream materials sprayed from an orifice upon the surface of a rotating copper roll. When the atomized stream strikes and splotches against the cool surfaces of the roll, rapid quenching takes place and a multiple series of random shaped flakes are formed. The present invention controls the shape and size of the final flake product. Controlling the shape and size, including thickness, are important in determining the physical properties of the product when the size of the product is very small.

Other prior art methods of handling molten materials to achieve rapid quenching of small particles thereof are discussed in U.S. Pat. No. 2,825,108 and U.S. Pat. No. 3,710,842.

SUMMARY OF THE INVENTION

The invention as herein disclosed is a method and apparatus for producing flake particles directly from molten metal or material having characteristics similar to molten metals, by projecting a stream of the material upon the serrated edge surfaces of a rotating drum-like member. A flake particle is formed on the connecting surface of each serration. The pointed edge of each serration formed by the intersection of the surfaces thereof acts to cut off the end of the projected impinging stream of material and to leave a single discrete particle on each serration.

For purposes of illustration of this invention, the product particle sizes are in the range of 20 to 30 mils square by 1 to 2 mils thick. However, the particle sizes could be larger or smaller, and could be generally rectangular in shape.

In the method of this invention, the stream of fluid material is projected through an atmosphere from a reservoir to the surface of the adjacent serrated rotating drum.

The rate of projection of material upon the surface of the drum, when properly controlled relative to the size and shape of the serrations and the speed of rotation of the drum, causes the stream of material to be cut into segments which adhere to the surfaces that cross the path of the projection stream. The drum, being maintained at a temperature well below that of the fluid stream, extracts heat from the fluid material, producing rapid quenching and at least partial solidification of the discrete segments which have taken the form of flake powder particles.

Preparation of materials and their projection are shown in U.S. Pat. No. 3,710,842, of which the inventor in this application is one of the co-inventors. The recited patent is assigned to the same assignee and is incorporated herein as necessary for adequate understanding of this disclosure.

One of the principal advantages of the present invention is the rapid and facile production of flake-powder possessing the desirable properties of very fine grain size and relatively large uniform individual surface areas.

In recent years, attention has been directed toward methods which produce a very fine particle size or very fine grain size within the particles of flake-powder. It has been observed that, when grain sizes or particle sizes decrease below several microns, there are significant advantages to be gained in terms of ease of processing, as well as the quality and properties of the product. Flake particles having grain size in a small range are equally useful for consolidation by hot isostatic compaction, sintering, hot extrusion, or hot forging and rolling processes which yield products with properties equivalent to or better than those of the raw alloys. The surface areas of the flake particles and powders are important also. While very fine powders are attractive, the huge total surface areas created in powders made up of these particles are readily contaminated, and handling becomes difficult. On the other hand, large particles with a very fine grain size are less easily contaminated while retaining many of the desirable characteristics of the very fine particles.

Rapid quenching is probably the simplest method for producing small grain sizes. In general, higher quenching rates produce smaller grain sizes, with quench rates of the order of $10^6$ C. degrees change per second of time, producing grain sizes (or dendrite arm spacing) of the order of 1 micron. It has been found difficult, to uniformly produce quench rates much above $10^4$ C. degrees per second in production.

In this invention the individual flake particles are very rapidly quenched and believed to be in the range of $10^5$ to $10^6$ C. degrees per second. An advantage is the uniformity of the product and particularly this grain size feature.

The metastability of material in the flake particles produced by rapid quenching of this invention is another important advantage.

Because of the size and shape of the flake particles produced in this invention, i.e. length or width over thickness in the range of 10 to 1 or 2, the particles do not readily agglomerate when brought together in large quantities (sometimes called "bird nesting"). On the other hand particles together flow freely and are easily poured or separated.

Because of their general shape recited above, particles y produced in this invention give promise of being ideal for a reinforcement mixed with other materials. In a matrix with other materials such as polymers, and the like, they strengthen the matrix along both width and length dimensions. This is in contrast to cylindrical particles which increase the strength of the matrix along their length dimension only. They also appear to be appropriate to the improvement of electrical conductivity when interspersed into polymers and other matrices. When the flake particles are made of ferro magnetic amorphous material the composite would be expected to have excellent ferro magnetic shielding characteristics.

An additional important potential use of the flake particles produced by the method and apparatus of this invention is in paints and coating products. Particles of a uniform size are an advantage as an additive in certain situations.

DESCRIPTION OF THE DRAWINGS

FIG. 1 is a vertical section of a melt projection apparatus showing a rotating head extracting drum-like member having serrations on the periphery thereof producing flake particles from the projected material.

FIG. 2 is an enlarged cross section of the edge of the drum-like member, viewed on line 2—2 of FIG. 1, showing the projected stream of molten material and the configuration of the flake particle on the angular surface of the serration near the edge of the rotating drum-like member.

DETAILED DESCRIPTION OF THE INVENTION

Figure 3:
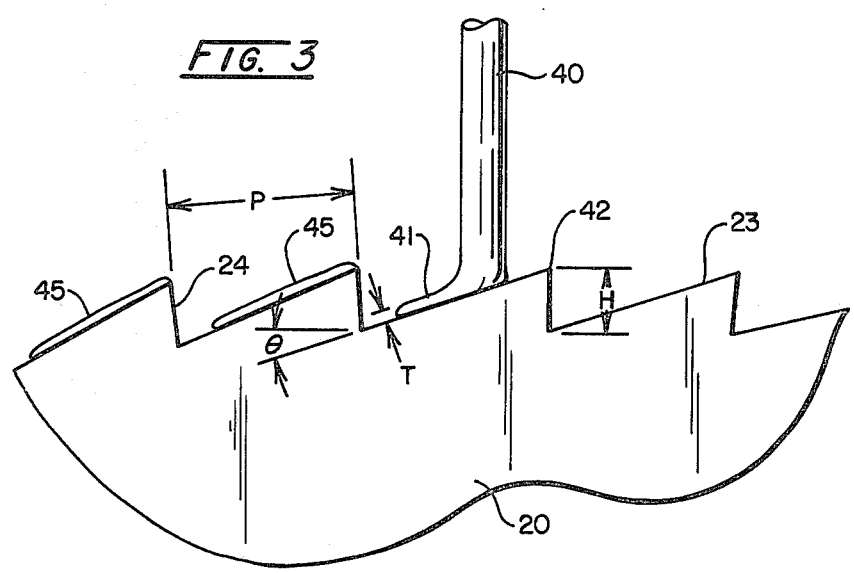
FIG. 3 is an enlarged elevational view of the edge of the drum-like member at the position of contact of the projected stream upon the drum-like member, illustrating the configuration of the serrations and the shape of the formation of the flake particle, and further illustrating the thickness dimension of the flake particle.

The means and apparatus by which the process of making flakes is carried out is illustrated in one embodiment, in FIG. 1.

For the making of flake particles a rotatable heat extracting drum-like member 20 having a serrated periphery is rotated beneath a reservoir of molten material 21. Although the drum-like member 20 is described as a circular drum, other uncircular shapes might be used in certain circumstances. Drum 20 is rotated on a shaft 22 that is connected through a conventional type of transmission device, such as an electric motor, gear box or other well known apparatus not shown. Other well known means is provided to control the speed of rotation of the shaft 22 and consequently the peripheral velocity of edge surfaces 23 and 24, respectively, of drum 20.

The reservoir of molten material 21 is supported in a crucible container 25 which is made of a usual crucible material, such as graphite. At its lower end, crucible 25 is provided with a projection plate 26 which is made of a material such as boron nitride. Plate 26 has a generally centrally located orifice hole 27 and is retained in crucible 25 by means of a threaded collar 28 or other suitable retainer means. Crucible 25 is wrapped circumferentially with heating means such as asbestos coated electrical resistance wire 29. At its upper end, crucible 25 is closed with a threaded plug 35. Plug 36 is provided with a centrally located tube fitting 36. Fitting 36 is connected to a source of pressurized inert gas such as argon, not shown.

As a result of the super atmospheric pressure in the container 25, a stream 40 of molten material is projected through the orifice hole 27 and against the serrated drum 20.

Referring to FIG. 3 in conjunction with FIG. 1, the surface 23 of each serration is inclined at an angle $\theta$ to the tangent of curvature of the drum-like member 20 at the base of the serration. Surface 24 is substantially radial with respect to the center of rotation of the drum. Angular surface 23 and radial surface 24 meet in an edge 42 which is parallel to the axis of rotation of the drum.

Surface 23 cools the molten material 21 very rapidly upon contact. At the same time surface 23 imparts lateral peripheral motion to the molten material of the stream. The solidifying end 41 of the stream 40 is carried away from the point of contact.

As the edge 42 passes beneath the stream 40, it cuts off that portion which has impinged upon surface 23 and is in the process of solidification. A discrete segment remains on each surface 23 in the form of a flake particle 45 that is carried beyond the end of the stream and moves with the rotation of the drum.

The continued rotation of drum 20 causes many of the flake particles 45 to be ejected from the surfaces 23 by centrifugal force. A container 46 is placed beside and beneath the drum 20 and receives flake particles 45 in a pile 47.

For reasons that will be explained hereafter, it has been found in the practice of this invention that a portion of flakes 45 do not release and are carried further toward the bottom of the drum 20. A wiper wheel 48 made of suitable soft polisher-like cloth material, such as a cotton buffing, is rotated on a shaft 49 in a position to wipe surfaces 23 and remove those particles 45 that have not been ejected by centrifugal force. Rotation of wheel 48 is contra to the rotation of drum 20 to provide maximum wiping action. Those flake particles 45 that are wiped from the drum 20 are projected by wheel 48 into the pile 47.

Referring to FIG. 2, a portion of drum 20 is shown with the solidifying end 41 formed on surface 23 by the stream 40 as the surface 23 moves away from the line of projection of the stream 40.

Because the particles are relatively small in size and the process is carried out at a speed more rapid than the human eye can distinguish, the precise details of the formation of a flake particle, and its exact configuration at each instant of drum rotation, as well as the degree of solidification are not precisely known. Nevertheless, it has been observed that the process produces a product having many advantages as will be further described in examples below.

Figure 4:
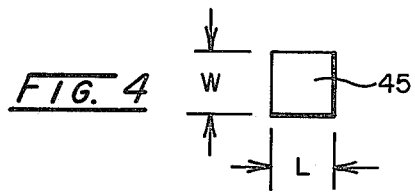
FIG. 4 shows a dimensional view of the form of a flake particle.

In FIG. 3, the thickness T of a flake particle 45 is shown. In FIG. 4, the substantially rectangular shape of a flake particle 45 is shown, with length L and width W substantially equal, which is a preferred embodiment of the product produced by this invention.

In the operation of this invention, when the stream of molten material contacts the surface 23 it spreads out and tends to form a ribbon in the direction of movement of the surface beneath. The width of the ribbon becomes the eventual width W of the flake particle. The thickness of the ribbon becomes the thickness T of the flake particle. Width W and thickness T are determined by several variables that must be controlled in the successful practice of the invention. These variables include velocity of the molten material 21, the viscosity of the molten material 21, the diameter of the stream 40, and the speed of the angular surface 23. Since the length P of the angular surface 23 and the height H of the radial surface 24 are determined by the construction and configuration of the drum 20, the velocity of the surface 23 relative to the stream 40, determine the length L of the flake particle.

Figure 5:
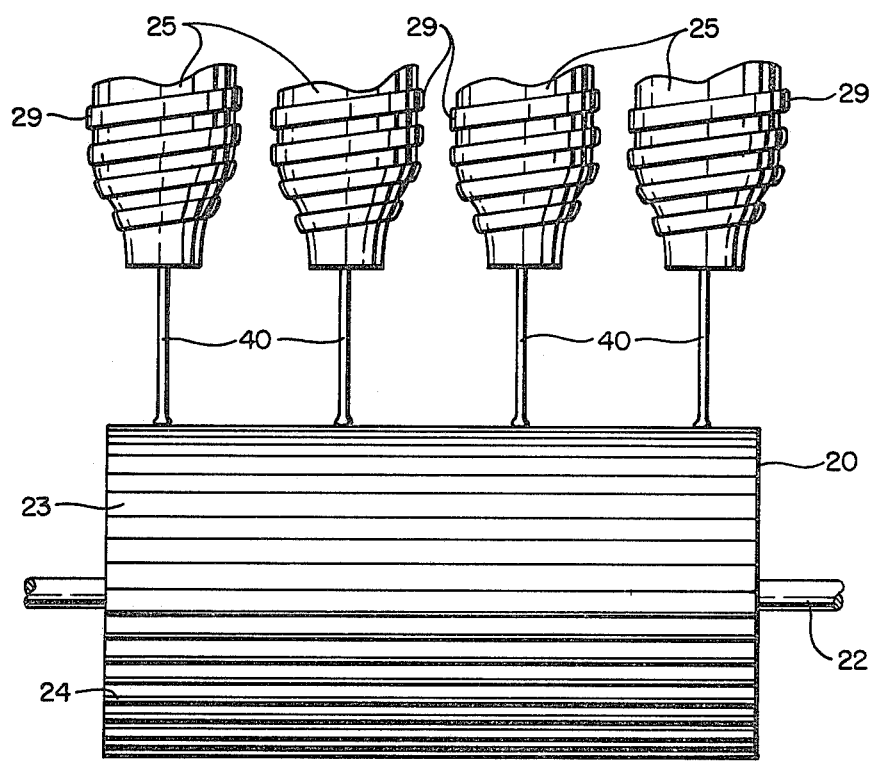
FIG. 5 shows a partial cross section of a multiple stream projection apparatus with a drum-like heat extracting member.

In FIG. 5, another embodiment of the invention is shown in which the production rate is increased by the use of multiple streams 40' projected upon a serrated drum-like member 20' which is supported for rotation upon the shaft 22'. A plurality of substantially identical containers 25' are supported above rotating drum 20', by means not shown. Containers 25' may be of the same construction and configuration as the crucible 25 previously described. Each of the containers 25' is wrapped circumferentially with heating means such as asbestos coated electrical resistance wire 29'. The shape and size of the serrations formed by angular surface 23' and radial surface 24' are substantially the same as those described for the previous embodiment of FIGS. 1 and 3, except that the surfaces are much bigger to conform to the greater width of the drum 20'.

Once the apparatus dimensional parameters have been chosen such as the diameter of the drum 20, 20', the length P of the angular surfaces 23, 23', and the height H of the radial surfaces 24, 24' and constructed into the drum, the process is controlled by adjustment of the pressure in the container 25, 25', and the speed of rotation of the drum 20, 20'.

Various evaluations of this invention have been made. Without limiting the scope of the invention, it has been found that good product can be made by using the following parameters: drums of approximately 8 in. in diameter, a stream diameter of 0.020 in., a stream velocity of 120 in. per second, a radial surface height H of 0.004 in. Under these circumstances the drum surface must move 0.020 in. or more in the time it takes for the stream, moving at 120 in. per second, to go 0.004 in. This time is $3.33 \times 10^{-5}$ seconds. For the drum surface to move 0.02 in. in $3.33 \times 10^{-5}$ seconds requires a tangential surface velocity of 600 in. per second. For an 8 in. diameter serrated drum this translates to a rotational speed of approximately 1500 rpm. Experiments employing different rotational speeds have produced acceptable product with tangential surface speeds between about 400 in. per second and 4000 in. per second.

It was observed that the length of the serration P serves only to control the length of the particle cast and is not a matter requiring control for the successful practice of the invention.

It will be clear from the above disclosure that greater stream velocities (brought about by greater pressures), larger diameter streams, or smaller radial surface heights all require that the drum velocities be increased in order to produce discrete flake particles. Conversely, smaller stream velocities, smaller diameter streams, or greater radial surface heights, allow for lower drum velocities to produce discrete flake particles. Control is required of the drum speed relative to the stream parameters of size and velocity. It has been found that when the parameters are not properly controlled a corrugated single strand of solid material will be formed on the surface of the drum and either stick or peel off; or on the other hand random splattering takes place.

Where it is desired or necessary, the simplicity of the apparatus and the method lend to the use of a simple container (not shown) where an inert atmosphere is provided in the working zone surrounding the molten stream and the flakes. The atmosphere that is applied in the working zone is largely determined by the material being processed.

While aluminum, magnesium, and tin have been evaluated in the practice of this invention, there is no apparent reason that other materials such as stainless steel, mild steel, cast iron, and boron could not also be successfully practiced. Very high melting point materials such as niobium and titanium might be used if crucibles and melt projection apparatus were available.

MODE OF OPERATION OF THE INVENTION

The invention has been practiced with drums of various constructions as shown in Table A.

TABLE A

| Number | Thickness | Drum Material | P in. | H in. |
|---|---|---|---|---|
| 1 | ¼ in. | Copper | .08 | .002 |
| 2 | ¼ in. | " | .08 | .005 |
| 3 | ¼ in. | " | .04 | .003 |
| 4 | ¼ in. | " | .08 | .025 |
| 5 | ¼ in. | " | .08 | .006 |
| 6 | 1½ in. | " | .08 | .0025 |
| 7 | 1 in. | Brass | .06 | .004 |

In the practice of the invention, with the exception of drum number 4, all of the drums could be operated to produce suitable flake particles. The failure of drum number 4 to produce suitable flake particles is believed to be due to the fact that the ratio of the length P to the height H was too low, resulting in too large an angle $\theta$. As a result, it was observed that the angular surfaces of the serrations struck the stream with such violence at normal operating speeds that the formation of splash and splatter was caused. Thus the lower limit of the ratio of the length P to the height H for successful operation was shown to be at least greater than about thirteen. The ratio of P to H on drum numbers 3 and 5 is 13.33. All other drums recorded in TABLE A have higher ratios.

It has been found in the practice of the invention that the angular surfaces of the serrated drums must be relatively smooth. A freshly machined drum without buffing was the cause for the flakes to adhere strongly to the angular surfaces and very aggressive wiping had to be employed to remove them. However buffing and polishing the angular surfaces lead to immediate improvement, and lessened the need for wiping. Continued operation using a copper or brass drum caused a gradual erosion of the angular surfaces. This, in turn, caused a deterioration in the uniformity of the process and the product. Refinishing the angular surfaces by buffing restored performance. It is believed that the selection of materials having harder surfaces would prolong the successful use of the surfaces of the drums.

The surface smoothness of the angular surfaces 23, 23' will preferably have a finish of from less than 1 micro in. to approximately 40 micro in.

In the practice of the invention, the angle at which the projected stream of molten material strikes the drum was preferably between 80 and 90 degrees to the tangent of the projected peripheral surface of the drum. However, it was noted that the process is relatively insensitive to this angle. As the angle is decreased to significantly smaller amounts, the speed of rotation of the drum must be increased to compensate for the increased apparent diameter of the molten stream (i.e., the cylindrical molten stream is cut at an angle by the moving serrations and hence is oval in cross section).

An important consideration in the successful practice of this invention is obtaining molten stream stability. If the molten stream is unstable, impact on the serrated surface is irregular. As a consequence, the process becomes unstable and the product quality is decreased. It has been found that the molten stream stability is enhanced by bringing the orifice relatively close to the drum surface. A distance of ¼ to 1 in. has been found preferable, the former being preferred when working in a vacuum or in an inert atmosphere and the latter being preferred when the process is practiced in air or in an atmosphere that tends to form a stabilizing sheath about the molten stream.

The following specific examples in conjunction with the teaching of the above specification and the cited prior art are sufficient to enable one skilled in the art to carry out the present invention as well as to understand what is presently known about the invention.

EXAMPLE I

Flake particles of 7075 aluminum were produced by projection, in an argon atmosphere, of the molten stream through a 0.02 in. diameter orifice at a pressure of 6 psi onto an 8 in. diameter copper drum rotating at a controlled speed of 4700 rpm. The length P of the angular surfaces were 0.06 in. and the height H of the radial surfaces were 0.0025 in. The process produced flake with dimensions of approximately $L = 0.035$ in. $\times W = 0.05$ in. $\times T = 0.001$ in.

EXAMPLE II

Flake particles of 1100 aluminum were made by projection in an air atmosphere through an 0.015 in. diameter orifice at a pressure of 10 psi onto an 8 in. diameter brass drum while rotating at a controlled speed of 4000 rpm. The length P of the angular surfaces were 0.06 in. and the height H of the radial surfaces were 0.04 in. The process produced flake dimensions of approximately $L = 0.025$ in. $\times W = 0.05$ in. $\times T = 0.001$ in.

EXAMPLE III

Flake particles of magnesium were produced by projection in an argon atmosphere, of the molten stream through a 0.02 in. diameter orifice at a pressure of 6 psi onto an 8 in. diameter copper drum rotating at a controlled speed of 4700 rpm. The lengths P of the angular surfaces were 0.06 in. and the heights H of the radial surfaces were 0.0025 in. The process produced flake with dimensions of approximately $L = 0.035$ in. $\times W = 0.05$ in. $\times T = 0.001$ in.

It is herein understood that although the present invention has been specifically disclosed with the preferred embodiments and examples, modifications and variations of these concepts herein disclosed may be resorted to by those skilled in the art. Such modifications and variations are considered to be within the scope of the invention and the appended claims.

What is claimed is:

1. A method of producing flake particles from molten material, comprising:
    (a) rotating a heat-extracting drum having a serrated periphery, with each serration comprising surfaces that meet in an edge substantially parallel to the axis of rotation;

(b) projecting upon said serrated periphery a stream of molten material to form a discrete flake particle on each serration while removing heat from the particle and at least partially solidifying said particle on said serration;

(c) releasing said particle from said serration; and (d) cooling said particle in a surrounding atmosphere.

2. The method of claim 1, wherein said particles are released in step (c) by wiping the surface of said serration.

3. The method of claim 1, wherein each serration comprises a substantially radial surface and an adjacent angularly disposed surface connecting the base of the radial surface of the serration with the peripheral extremity of the radial surface of the adjacent serration.

4. The method of claim 3 wherein the speed of rotation is controlled with respect to the rate of projection and the height of each radial surface on each serration, to provide an interruption and discrete separation of the molten stream between each angularly disposed surface, forming a discrete flake particle on each serration.

5. The method of claim 1, wherein said heat extracting drum is contacted by a plurality of projected molten streams simultaneously and at substantially equivalent rates of projection.

6. A method of producing flake particles from molten material which is at a temperature within 25% of its equilibrium melting point in degrees K., said molten material having a viscosity of 0.001 to 1 poise and a surface tension of 10 to 2500 dynes per centimeter at said temperature, comprising:

(a) projecting a stream of the molten material through a surrounding atmosphere;

(b) rotating a heat extracting drum having a serrated edge in the path of the projected molten stream with the moving surfaces of the serrations in contact with and interrupting the flow of the projected stream, producing a discrete flake particle on each serration while removing heat from the particle and at least partially solidifying the particle on the serration;

(c) releasing the particles from the serrations; and (d) cooling the particles in a surrounding atmosphere.

7. The method of claim 6, wherein the particles are released in step (c) by wiping the surface of said serrations.

8. The method of claim 6, wherein each serration comprises a substantially radial surface and an adjacent angularly disposed surface connecting the base of the radial surface of the serration with the peripheral extremity of the radial surface of the adjacent serration.

9. The method of claim 8, wherein the tangential surface speed of the angularly disposed surfaces of the drum is between about 400 inches per second and about 4000 inches per second.

10. The method of claim 8, wherein the speed of rotation is controlled with respect to the rate of projection and the height of each radial surface on each serration to provide an interruption and discrete separation of the molten stream between each angularly disposed surface, forming the discrete flake particle on each serration.

11. The method of claim 8, wherein the ratio of the length of each angular surface to the height of each radial surface is greater than about thirteen.

12. The method of claim 10, wherein the speed of rotation of the drum is controlled relative to the velocity and diameter of the projected stream of molten material providing a quench rate sufficient to cool the molten material in contact with the surface at a rate of at least $10^5$ C. degrees per second.

13. An apparatus for the production of flake particles from a projected stream of molten material comprising:

(a) means for containing, heating, and projecting the stream of molten material at super atmospheric pressure;

(b) a heat extracting drum having a serrated periphery on which each serration comprises a substantially radial surface and an adjacent angularly disposed surface connecting the base of the radial surface with the peripheral extremity of the radial surface of the adjacent serration;

(c) means for rotating the drum about its central axis;

(d) means for controlling the rate of projection of said molten material; and (e) means for controlling the rate of rotation of the drum relative to the rate of projection of molten material during projection.

14. An apparatus according to claim 13, including in addition, means for wiping the surface of each serration during rotation of the drum.

15. An apparatus according to claim 14 wherein the wiping means comprises a cloth wheel.

16. Apparatus according to claim 13 wherein the ratio of the length of each angular surface to the height of each radial surface is greater than about thirteen.

17. An apparatus according to claim 13 wherein a container is provided surrounding the stream of molten material and the heat extracting drum.

* * * * *